United States Patent [19]

Burström

[11] 4,263,830
[45] Apr. 28, 1981

[54] FASTENING DEVICE

[76] Inventor: Bertil I. Burström, Boarp 790, S-262 00 Ängelholm, Sweden

[21] Appl. No.: 885,133

[22] Filed: Mar. 9, 1978

[30] Foreign Application Priority Data

Mar. 10, 1977 [SE] Sweden ............... 7702697

[51] Int. Cl.³ ........................... F16B 15/04
[52] U.S. Cl. ............... 411/477; 411/448; 411/471; 441/472; 441/442
[58] Field of Search ........... 85/11, 31, 26, 14, 18, 85/49

[56] References Cited

U.S. PATENT DOCUMENTS

| 141,810 | 8/1873 | Nichols | 85/11 |
| 866,357 | 9/1907 | Hammann | 85/11 |
| 2,033,613 | 3/1936 | Crosby | 85/49 |
| 2,404,245 | 7/1946 | Olsen | 85/31 X |
| 2,495,337 | 1/1950 | Lindham | 85/14 |
| 2,779,229 | 1/1957 | Jahn | 85/26 X |
| 3,058,385 | 10/1962 | Abrahamsen | 85/11 |
| 3,170,279 | 2/1965 | Dubini | 85/49 |
| 4,058,047 | 11/1977 | Kramer et al. | 85/11 |

FOREIGN PATENT DOCUMENTS

| 5382 of 1926 | Australia | 85/49 |
| 299448 8/1954 | Switzerland | 85/31 |
| 496338 11/1938 | United Kingdom | 85/31 |

*Primary Examiner*—Rodney H. Bonck
*Attorney, Agent, or Firm*—Karl W. Flocks

[57] ABSTRACT

The disclosure relates to a fastening device for driving into building material, the device consisting of one or more elongate V profiles whose shanks, in the vicinity of the forward, penetrating end of the profiles are outwardly relieved or bevelled such that building material, on driving of the device into the material, is trapped between the shanks and forces them apart. A tip at the forward end of the profile is designed such that, on being driven in, it moves in the driving-in direction.

15 Claims, 21 Drawing Figures

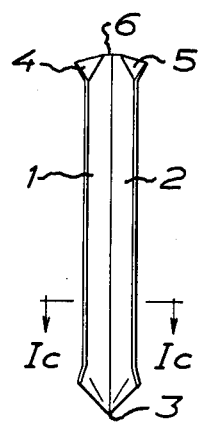 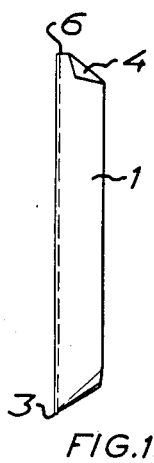 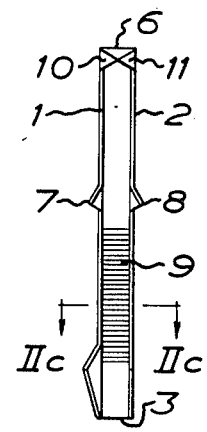 
FIG.1a  FIG.1b  FIG.2a  FIG.2b
 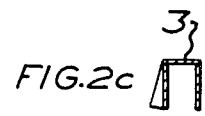
FIG.1c  FIG.2c
 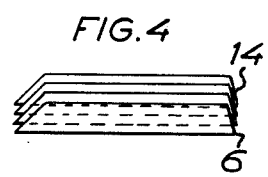
FIG.3c  FIG.4
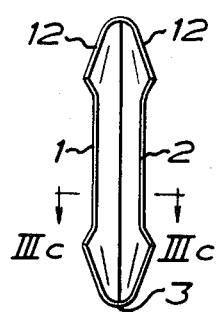 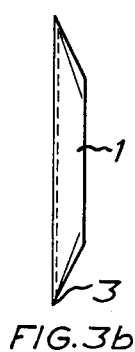 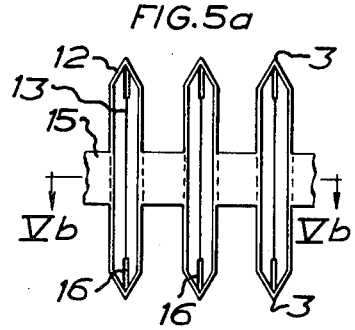
FIG.3a  FIG.3b  FIG.5a
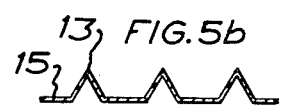
FIG.5b

FASTENING DEVICE

The present invention relates to a fastening device or connection device which is intended to be driven, by means of a hammer, nail gun or the like, into building materials, such as wood, lightweight concrete, plaster, plastics and other construction materials such as leather, and serves, in the driven state to support miscellaneous objects intended for suspension on or anchorage to the building material, such as mesh reinforcement, electric cables, fluid conduits, apparatuses etc., and to interconnect elements of building material. The device may be designed for the same function as a nail, staple or nail with spreading shaft. More precisely, the device according to the invention is of the type which is shaped as, or includes, a straight profile which has a forward penetration end and a rear end and which includes at least one portion, extending at least throughout the major portion of the length of the profile towards the rear end, and provided with a web and shanks connected thereto, the shanks being at their distal ends in relation to the web, substantially free, and the web forming a tip portion at the forward end of the profile.

High demands are placed on nails and staples etc. as regards economy and simple manageability at the same time as they are required to display great tensile, shearing and torsional strength. Furthermore, desires have been expressed from certain quarters as regards restriction of the driving-in length and the driving-in work, this latter being particularly important as far as industrial accidents are concerned. There are also needs in the art for nails or fixing devices for building materials such as lightweight concrete in which the nail, not fully driven in, may constitute a bend and withdrawal-resistant spacer and fixing means for additional insulating mats with exteriorly applied mesh reinforcement and plaster.

A large number of embodiments of nails, staples, screw nails and other fixing devices are known for wood and also for materials such as lightweight concrete, but the fixing devices which display good strength qualitites are relatively expensive to obtain and/or use, whereas the technical performance or the more economical variations is restricted.

The object of the present invention is to satisfy the desires and requirements touched upon above and to eliminate the above-mentioned inconveniences.

This object has been achieved according to the invention in that at least one of the shanks in association with the above-mentioned forward end has an obliquely outwardly pointing innner surface such that material, on driving of the device into the material, is trapped between the shanks and forces them apart. Moreover, the tip portion, taken in a section of the web in the longitudinal direction thereof, is substantially symmetrical as regards centre line of this section such that the tip portion, during the driving-in process, moves in the longitudinal direction of the web.

Such a device constructed according to the invention is preferably manufactured from a thin, cold-rolled (or rigidified and hardened in some other way) and resilient sheet-metal material which, for the production of a nail embodiment of the invention, is in strip form, the strip being bent longitudinally and preferably symmetrically to form an open fluted profile of V, U, C or like cross-section, one end of the profile being pointed or obliquely cut with the point in the line of symmetry of profile, and one or both shanks of the profile in association with the pointed end are relieved slightly apart or outwardly as seen from the line of symmetry so that material, on driving-in of the nail, is collected between the shanks and thereby successively forces them outwardly from each other to a steadily larger opening angle, depending upon the degree to which the nail has been driven in, the relief, the material rigidity, the fibre direction etc. In order to increase this wringing or twisting and effect, the ends of the shanks in association with the point may moreover be bevelled or sharpened from the inside outwardly, which makes for easier driving-in of the nail. If the basee of the shanks (or the web connecting them in a region of the tip end) is weakened by, for example, a deep fold or by stamping, or if the shanks, thanks to softer profile material, are relatively yieldable, a single interior bevelling on each shank end can give sufficient wringing or twisting effect without the need to resort to relieving the shanks. The presence of the above-mentioned bending, stamping or folding is advantageous and to be preferred since the effect is, as it were, of a hinge about wich the profile shanks twist under the driving-in and forcing-apart processes.

At the other, rear end of the profile—the shaft or head end of the nail—the shanks can be obliquely and sharply outwardly or inwardly bent a short distance from the central or web portion of the profile, so that the web portion thereby projets forwardly at the head end, with the advantageous result that the tool used for the driving-in operation most easily strikes only this portion so that the risk for deformation or breaking of the profile is reduced to a minimum. Alternatively, the shanks may be obliquely (for example about 15°–30°) severed a distance from the head end which originally extended at right angles to the line of symmetry of the profile. If a recess of suitable size is made in the shanks close to the head end, this recess forms a practical means of fixation for wire, plaster mesh, electric cables and the like.

In other embodiments of the device according to the invention, several profiles in accordance with the above- decribed embodiment are interconnected. According to one variation, two such profiles are fixedly connected at the profile ridges such that a stellar formation is obtained in which the shanks constitute the points. In another variation, the bottom or web inner sides of two profiles are turned towards each other and the shanks are connected to each other at the rear ends of the profiles. These two profiles may lie closely adjacent one another such that the profiles together will be substantially tubular in form; or, spaced from each other such that the profiles and their connection will be in U-shape for thus forming a staple.

It should be observed, in the device according to the invention, that its tip, formed by the web (in the embodiment relating to nails and staples), or tips (in the embodiment relating to nails with spreading shafts) is designed such that the device, on being driven into the material entirely, moves in the longitudinal direction of the web, or the driving-in direction. Thus, the tip or tips point in the same direction as defined by the web. This may also be expressed such that the tip portion, seen in a section of the web in the longitudinal direction thereof, is substantially symmetrical with respect to the centre line of this section. During the driving-in process, the tip portion moves, thus, in the driving-in direction and displays no natural striving to deviate from this direction.

In a furtherr modification of the device according to the invention, profiles of the first-mentioned embodiment are interconnected broadside-on, and the device can be punched and pressed from a strip whose width corresponds to the length of the nails or profiles, a smaller connecting piece interconnecting the shanks between the nails. This embodiment is usuable as a shear, tensile and torsion resistant union in, among other constructions, pile joints and corner joints in roof truss structures, in which the nail strip is then placed as a round collar before the pressing together of the building elements.

Thanks to its wringing function, the device can also anchor well in end pieces and, if it is provided with the above-described tip at both ends, it can function as a powerful spike also for end pieces with, thanks to its progressive effect, approximately equilateral peneration in each wooden piece.

When the fastening device is used for the suspension of insulation mats, mesh reinforcement and plaster, it is driven only partly into the substrate. Equally long free shaft lengths are obtained if a small flap on the shanks is outwardly or inwardly bent between the profile ends, these flaps forming stops against the substrate when the device is driven into it.

The good withdrawal resistance of the fastening device is based partly on the resiliently-acting pressure from the shanks of the profile on the material along a large widespread surface, and the thence emanating withdrawal-preventing friction forces; and partly on the resistance of the device against reassuming its original shape since the device must, on withdrawal, go out the same way it came in the material, unless the material breaks or is deformed because of the great angular expansion or wringing of the profile or if the building material is too brittle or weak. The withdrawal strength can be further increased if the insides and outsides of the shanks are provided, for example by stamping, with grooves or scale-like patterns in conjunction with the manufacturing process, these grooves suitably being oriented at right angles to the longitudinal axis of the profile. A corresponding effect can also be achieved by suitable material coating or chemical processing.

Thanks to the open profile, without any inaccessible, moisture-trapping cavities, the device is suitable from the point of view of corrosion. The open profile section imparts to the device, in relation to its weight, good resistance to shearing and low bearing stress in the material after driving-in, as well as good resistance to bending, twisting and buckling. In several embodiments, the device moreover allows of the nesting of several elements in each other, which facilitates automation of the driving-in operation, for example, by means of a compressed-air nail gun.

However, the material for the fastening device according to the invention need not necessarily be elastically resilient for achieving good withdrawal resistance. Hence, in many cases common sheet iron may constitute the starting material for the manufacture of the device, but, for example, hard plastic sheeting is usable when the building material is relatively soft.

The nature of the present invention and its aspect will be more readily understood from the following brief description of the accompanying drawings, and discussion relating thereto.

BRIEF DESCRIPTION OF THE DRAWINGS

FIG. 1a is a front elevational of one embodiment of the invention;

FIG. 1b is a side elevational of the embodiment illustrated in FIG. 1a;

FIG. 1c is a horizontal cross-section taken along line Ic—Ic of FIG. 1a and looking in the direction of the arrows;

FIG. 2a is a view similar to FIG. 1a but of another embodiment;

FIG. 2b is a view similar to FIG. 1b but of the embodiment illustrated in FIG. 2a;

FIG. 2c is a horizontal cross-section taken along line IIc—IIc of FIG. 2a and looking in the direction of the arrows;

FIG. 3a a is a view similar to FIG. 1a but of still another embodiment;

FIG. 3b is a view similar to FIG. 1b but of the embodiment illustrated in FIG. 3a;

FIG. 3c is a horizontal cross-section taken along line IIIc—IIIc of FIG. 3a and looking in the direction of the arrows;

FIG. 4 is a view in elevation of a nest in the form of a magazine of nail devices;

FIG. 5a is a view in elevation of a strip of nail devices;

FIG. 5b is a view in horizontal cross-section taken along line Vb—Vb of FIG. 5a and looking in the direction of the arrows;

FIG. 7b is an end elevation of the staple illustrated in FIG. 7a;

In the accompanying drawings:

FIGS. 1a, b and c illustrate a nail device in a sharply-bent V-profile embodiment, in which the shanks 1 and 2 are outwardly relieved in association with the nail tip 3 and obliquely and sharply outwardly bent to form lugs 4 and 5 in association with the head end 6;

FIG. 2 illustrates, in the same views as in FIG. 1, another nail device in sharply bent U-profile embodiment, where only the one shank 1 is outwardly relieved at the tip end and where both of the shanks are provided with outwardly bent stops or flaps 7, 8 and with a friction-increasing stamping 9 throughout a portion of the shank outer sides and of the bottom or web inner side. At the head end, the shanks have been obliquely and sharply inwardly bent to lugs 10 and 11;

FIG. 3 illustrates, in the same views as FIG. 1, a C-profile embodiment in which both ends have been obliquely severed and outwardly relieved and moreover provided with oblique bevelling 12 to form a spike embodiment.

FIG. 4 shows nail devices in a V-profile embodiment nested in each other to form a magazine in which each nail head 6 has been provided with an oblique severing 14 a distance from the central or web portion of the profile;

FIGS. 5a and b illustrate a strip of V-shaped nail devices spiculated at both ends 3, united by means of connection pieces 15, the devices having interior oblique bevelling 12 instead of relieving at the shank ends and with shank bases or shank webs at both profile ends weakened by means of grooves 16 in the material thickness. The grooves 16 can also be realized, by, for example, stamping;

FIG. 6 illustrates two V-profile nails partiallly driven into building material 17 which is provided with exteriorly placed supplementary insulation 18 and mesh reinforcement 19 which is hooked onto recesses 20 provided in the shanks adjacent the nail head 6. The rear ends 21 and 22 of the shanks can, after driving-in of the device, be bent over and fix the mesh 19 which unites and supports the cement plaster 23. FIG. 6 may also be viewed such that the left-hand nail is a side elevation of the right-hand nail;

FIGS. 7a,b illustrate an embodiment of the invention in which two V-profile nails are interconnected by means of a bow 24 to form a staple in which one tip portion has been driven into a wooden board 25;

FIGS. 8 and 9 are cross-sections of two variations of the V-profile embodiment in which the web connecting the shanks 1 and 2 is folded, these variations providing increased resilience, change of shape and withdrawal resistance;

FIGS. 10a and b show two identical devices connected to tubular form, each device having shanks bent from a strip-like web portion 26, the shanks on one device being connected, for example by welding, to corresponding shanks on the othe rdevice at the head end thereof. At the forward ends of the devices, the shanks are outwardly relieved and bevelled. This embodiment may also be produced from a square tube which is slit at diametrically opposed places from the tip to the vicinity of the other end, and the thus obtained shanks being relieved outwardly at the tip end and possibly bevelled; and FIGS. 11a and b show two identical devices of the same embodiment as that of FIG. 10 which are connected by, for example, welding, in web 26 back-to-back relationship to form a stellar configuration.

Figure 6:
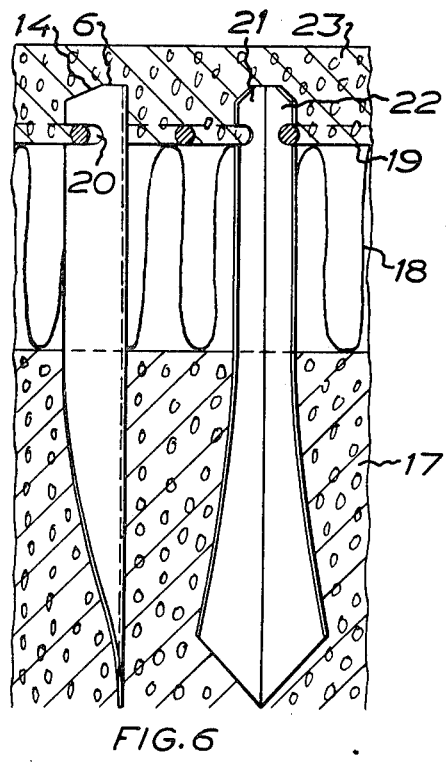
FIG. 6 is a view partially in elevation and partially in cross-section illustrating nails in relation to building material.
Figure 7A:
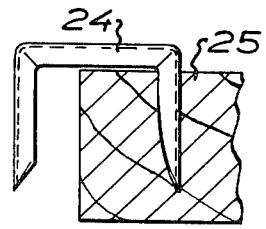
FIG. 7a is a view similar to FIG. 6 but of a different form of the invention.
Figure 7B:
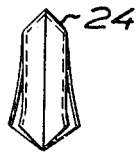
Figure 8:
FIGS. 8 and 9 are outlines corresponding to cross sections of two variations of the V-profile embodiment illustrated in FIGS. 1a, 1b, and 1c.
Figure 9:
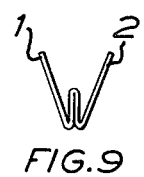
Figure 10A:
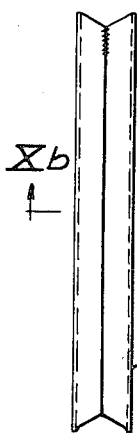
FIG. 10a is a view in elevation of a tubular form of the invention.
Figure 10B:
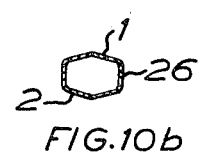
FIG. 10b is a horizontal cross-section taken along line Xb—Xb of FIG. 10a and looking in the direction of the arrows.
Figure 11A:
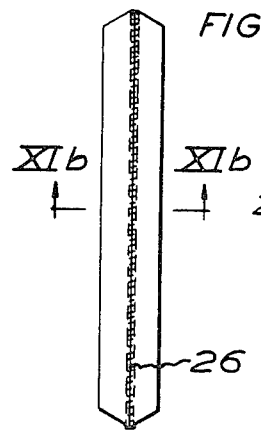
FIG. 11a is a view in elevation of a stellar configuration of the invention.
Figure 11B:
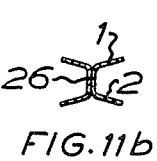
FIG. 11b is a horizontal cross-section taken along line XIb—XIb of FIG. 11a and looking in the direction of the arrows.

What I claim and desire to secure by Letters Patent is:

1. A device such as a nail, spike, staple and the like, to be driven into construction material such as wood, lightweight concrete, plaster and other construction materials such as leather, the device comprising a straight profile which has a forward, penetration end and a rear end which includes at least one portion extending from the forward end at least throughout a portion of the length of the profile to the rear end, and having a web and shanks connected to the web, the shanks being, at their distal edges in relation to the web, substantially free, and the web forming, at the forward end of the profile, a tip portion, said shanks being at least as wide as said web in directions normal to the length of said device wherein at least one of the shanks in association with said forward end has an obliquely outwardly flared lip on the inner surface of said at least one of the shanks, said flared lip being directed in the forward direction from rearwardly of said tip portion whereby as said device is driven into the construction material, such material is trapped between the shanks and forces the shanks apart from each other and to undergo a wringing or twisting effect in opposite directions, and wherein the tip portion is located on said device so that under the driving-in process, it moves substantially in the longitudinal direction of the web.

2. Device according to claim 1, wherein the shanks are sharply bent from the web.

3. Device according to claim 1 or 2, wherein the web is substantially linear for forming a V-profile.

4. Device according to claim 1 or 2, wherein the web is strip-shaped for forming a U-profile.

5. Device according to any one of claims 1 or 2, wherein the connection between the web and the shanks includes a weakening.

6. Device according to any one of claims 1 or 2, consisting of a resilient material.

7. Device according to any one of claims 1 or 2, wherein said obliquely outwardly pointing surface is bevelled 8. Device according to any one of claims 1 or 2, wherein said obliquely outwardly pointing surface is outwardly relieved.

9. Device according to any one of claims 1 or 2, wherein the shanks, at said rear end, are bevelled in a direction towards the forward end.

10. Device according to any one of claims 1 or 2, wherein the shanks, at said rear end, are bent to one side.

11. Device according to any one of claims 1 or 2, wherein said rear end has a configuration similar to that of said forward end for forming a spike.

12. Device according to any one of claims 1 or 2, wherein the profile includes two of said profile portions.

13. Device according to claim 12, wherein the outer sides of the webs on the profile portions are fixedly interconnected.

14. Device according to claim 12, wherein the inner sides of the webs on the profile portions face each other, and wherein the shanks on one profile portion are connected to the shanks on the other profile portion at the rear end of the profile.

15. Device according to any one of claims 1 or 2, wherein the profile includes several such profile portions which are spaced apart from each other in a transverse direction of the profile and are interconnected.

* * * * *